UNITED STATES PATENT OFFICE.

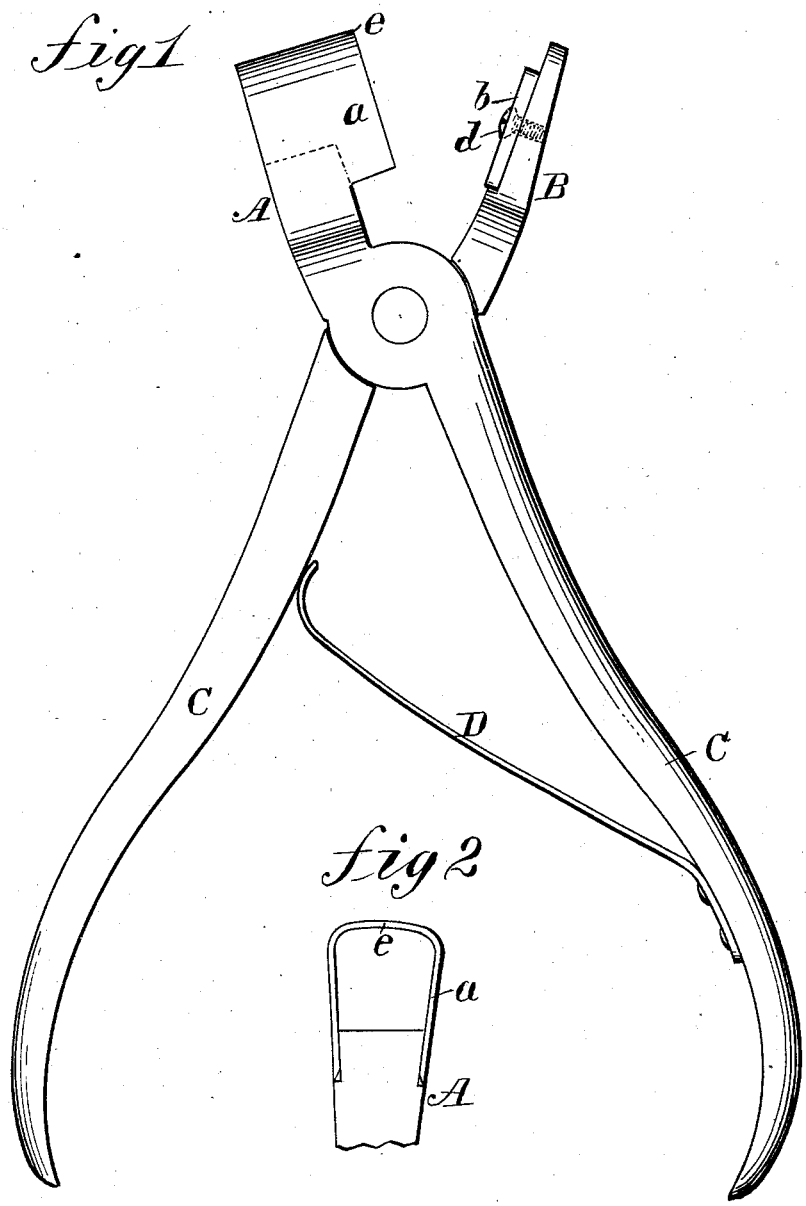

WILLIAM B. LYON, OF PONTIAC, ILLINOIS.

HOG-NOSE CUTTER.

SPECIFICATION forming part of Letters Patent No. 279,779, dated June 19, 1883.

Application filed September 30, 1882. (Model.)

*To all whom it may concern:*

Be it known that I, WILLIAM B. LYON, of Pontiac, in the county of Livingston and State of Illinois, have invented a new and Improved Hog-Nose Cutter, of which the following is a full, clear, and exact description.

The anatomy of a hog's snout reveals two main ligaments or tendons at the upper side of the snout, which are essential to the "setting" of the rooter in the act of rooting. These ligaments lead down the face of the hog from near his eyes, and at the point where they attach themselves to the rooter are very near together. I have discovered that these ligaments may be cut without permanent injury to the hog, and that by so doing he will be prevented from rooting.

My invention therefore consists of a simplified tool or implement by which one or both of these ligaments may be quickly and easily cut, which is an improvement on the tool described and shown in my Patent No. 248,766, dated October 25, 1881. My improved implement, while cutting the ligaments, at the same time leaves a protruding lump of flesh attached to the hog's hose, which will also tend to keep him from rooting.

Reference is to be had to the accompanying drawings, forming a part of this specification, in which similar letters of reference indicate corresponding parts in all the figures.

Figure 1 is a side elevation of my improved hog-nose cutter. Fig. 2 is a detailed plan view of the jaw of the implement which has the knife, and Fig. 3 is a detailed plan view of the face of the other jaw of the implement.

The jaw A of the implement is formed or provided with the U-shaped knife or cutter $a$, and the jaw B is by preference provided with the brass plate $b$, against which the ends of the knife $a$ are adapted to cut. This plate $b$ is shorter than the knife $a$, and is made adjustable by means of the slot $c$ therein and the screw $d$, which passes through the slot and holds the plate to the jaw, and when the implement is in use this plate should be so adjusted that the outer edge, $e$, of the knife will not come upon it, so that the lump of flesh inclosed by the knife will not be entirely severed from the hog's nose. The shanks C C of the implement are held apart by the spring D, placed between them and attached to one of the shanks, as shown.

The implement is used in the following manner: Stand in front of a hog, open the nippers, and place the knife on top of his rooter, in the center, with the forward end resting on the lower ends of the upper ligaments; then press the handles and pull toward you till the forward ends of the blades pass through the skin and ligaments; then stop pulling, but continue pressing the handles till the knives pass clear through the rooter on each side. When this is done, hold on to the handles with one hand, and with the other take hold of the points of the rooter on the outside of the knives and pull up on them, so as to be sure that the knives have cut clean through on the sides, as the small shreds of flesh not cut off by the portion $e$ of the knife will hold the middle piece in place, so it will drop down in front of the hog's nose between the nostrils, but not under the nose, to act as a preventive against rooting.

Having thus fully described my invention, I claim as new and desire to secure by Letters Patent—

A hog-nose cutter having cross-pivoted handles, a jaw provided with the U-shaped cutter $a$, and a jaw, B, provided with a slotted plate, $b$, made shorter than the cutter and secured adjustably by a screw, $d$, whereby the tendons in the upper side of the snout may be cut so as to leave a lump of flesh on the nose, as and for the purpose specified.

WM. BROWN LYON.

Witnesses:
  N. KUTSON,
  PHILIP ASMAN.